United States Patent
Nozaki

(10) Patent No.: US 8,407,232 B2
(45) Date of Patent: Mar. 26, 2013

(54) DOCUMENT SEARCH SYSTEM

(75) Inventor: Yasuyuki Nozaki, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 0 days.

(21) Appl. No.: 12/999,521

(22) PCT Filed: Jun. 12, 2009

(86) PCT No.: PCT/JP2009/060784
§ 371 (c)(1),
(2), (4) Date: Dec. 16, 2010

(87) PCT Pub. No.: WO2009/154153
PCT Pub. Date: Dec. 23, 2009

(65) Prior Publication Data
US 2011/0082878 A1    Apr. 7, 2011

(30) Foreign Application Priority Data
Jun. 18, 2008    (JP) .................. 2008-159621

(51) Int. Cl.
G06F 17/00    (2006.01)
(52) U.S. Cl. ........ 707/748; 707/600; 707/708; 707/717; 707/722; 707/727
(58) Field of Classification Search .................. 707/600, 707/748, 706, 717, 722, 727
See application file for complete search history.

(56) References Cited

U.S. PATENT DOCUMENTS 7,194,483 B1 * 3/2007 Mohan et al. ................. 707/600
7,536,413 B1 * 5/2009 Mohan et al. ......................... 1/1
(Continued)

FOREIGN PATENT DOCUMENTS

CN    101164067 A    4/2008
JP    05-250411 A    9/1993
(Continued)

OTHER PUBLICATIONS

English translation of Written Opinion of the International Searching Authority in the related International Application No. PCT/JP2009/060784 (5 pages).

(Continued)

Primary Examiner — Sana Al Hashemi
(74) Attorney, Agent, or Firm — Lucas & Mercanti, LLP

(57) ABSTRACT

With respect to retrieving documents of interest using a search system, it is made possible to provide a document search system for retrieving documents of interest efficiently and intuitively. Along with a display of a list of search results, new query candidates as well as the hit counts returned with those queries are presented. Specifically, there is provided: a related word dictionary in which related words of search keywords are gathered; a related word query generation processing part configured to extract from the related word dictionary a related word of a search keyword contained in a first query that has been entered, and to generate a second query, which is a new query, using the related word; a search execution part configured to calculate an increase/decrease between the hit count for search results returned with the first query and the hit count for search results returned with the second query; and a search result display processing part configured to simultaneously display on a display part: the first query; the search results returned with the first query; the hit count for the search results; the second query; the hit count for the search results returned with the second query; and the increase/decrease.

6 Claims, 7 Drawing Sheets

U.S. PATENT DOCUMENTS

| | | | |
|---|---|---|---|
| 7,890,514 B1 * | 2/2011 | Mohan et al. | 707/748 |
| 2001/0004402 A1 | 6/2001 | Katayama | |
| 2004/0181520 A1 | 9/2004 | Imaichi et al. | |
| 2004/0249804 A1 | 12/2004 | Nakayama et al. | |
| 2006/0271524 A1 | 11/2006 | Tanne et al. | |
| 2007/0255702 A1 * | 11/2007 | Orme | 707/5 |

FOREIGN PATENT DOCUMENTS

| | | |
|---|---|---|
| JP | 05-314182 A | 11/1993 |
| JP | 06-187374 A | 7/1994 |
| JP | 10-334105 A | 12/1998 |
| JP | 11-015841 Y | 1/1999 |
| JP | 2001-175668 A | 6/2001 |
| JP | 2004-295797 A | 10/2004 |
| JP | 2004-341753 | 12/2004 |
| JP | 2005-100136 A | 4/2005 |
| JP | 2006-012078 A | 1/2006 |
| JP | 2006-185020 Y | 7/2006 |
| WO | WO 2006/121702 A1 | 11/2006 |

OTHER PUBLICATIONS

Pages 1, 2, 8 and 9 of Office Action dated Aug. 31, 2012 issued in related Chinese Application No. 200980123275.1 (4 pages).

English language translation of pp. 1 and 2 of Office Action dated Aug. 31, 2012 issued in related Chinese Application No. 200980123275.1 (3 pages).

* cited by examiner

FIG. 7

```
┌─────────────────────────────────────────────────────────────────────┐
│ Search System                                            _ □ ☒      │
├─────────────────────────────────────────────────────────────────────┤
│ Search results for "human resource development OR education". Hits 1-10 of 2,152: ▲│
│   Additions to the previous query "human resource development" are marked with a ☆ │
│701│   1. AuditMaterialFY2000.doc                                    │
│       As human resource development activities in our department... │
│    ☆ 2. ComputerLearningSystemHandbook.pdf                          │
│       There will be implemented a system that allows employees to receive specialized│
│       training pertaining to their work via PC...                   │
│       3. RecruitmentLeaflet.pdf                                     │
│       At our company, we support individuals in their career development through a system of│
│       extensive human resource development...                       │
│    ☆ 4. FY2008_NoteOnEducationRegistration.htm                      │
│       At each department, please select in-house education courses to attend, and by │
│       March 15th submit...                                      ▼   │
├─────────────────────────────────────────────────────────────────────┤
│702│ Next query candidate:                                        ▲  │
│   ┌─ Query Generation Method ──────────────────────────────────┐    │
│703│ ○ Generate based on related words                          │    │
│   │ ● Generate using frequently occurring keywords appearing in│    │
│   │   the group of documents in the search results            │    │
│   │ ○ Generate by omitting a portion of the keywords in the query│  │
│   └────────────────────────────────────────────────────────────┘    │
│   "course guide," "new recruit" and "course completion report" have been│
│   identified as keywords frequently contained in the search results.│
│   (1) "(human resource development OR education) AND course guide" results in │ ┌──────┐ │
│       572 hits (-1,580 hits)                                          │ │Search│ │
│   (2) "(human resource development OR education) AND course completion report"│ ┌──────┐ │
│       results in 89 hits (-2,063 hits)                                │ │Search│ │
├─────────────────────────────────────────────────────────────────────┤
│704│ Keyword correlation among        ┌──────────────────┐            │
│    query candidates                  │ human resource   │            │
│                                      │ development OR education │    │
│    ┌────────────────────────┐                                        │
│    │ ☑ human resource       │       ┌─ course guide ─┐  1443         │
│    │   development OR... (2152)│                                     │
│    │ ☑ course guide (682)   │                        ┌─ course completion report ─┐│
│    │ ☑ new recruit (246)    │        538                              │
│    │ ☑ course completion report (89)│                  85             │
│    │                        │         81  34  48   4                  │
│    └────────────────────────┘            29                           │
│                                          131  ┌─ new recruit ─┐       │
├─────────────────────────────────────────────────────────────────────┤
│  ┌──────────────────────────────────────────────┐        ┌──────┐   │
│  │ human resource development OR education      │        │Search│   │
│  └──────────────────────────────────────────────┘        └──────┘   │
└─────────────────────────────────────────────────────────────────────┘
```

DOCUMENT SEARCH SYSTEM

This is a U.S. National Phase Application under 35 U.S.C. 371 of International Application PCT/JP2009/060784, filed on Jun. 12, 2009, which claimed the priority of Japanese application No. 2008-159621, filed Jun. 18, 2008, the entire content of both applications are hereby incorporated by reference.

TECHNICAL FIELD

The present invention relates to document search systems, and to, for example, document search systems for assisting in retrieving documents of interest from a vast document DB.

BACKGROUND ART

Search techniques in which a search is performed by entering a search keyword in trying to find documents of interest from among vast document DBs accumulated on the Internet, an intranet, or a file server are powerful means that are often employed. Internet searches are often performed to gather past findings and related information regarding a certain theme for which no particular documents of interest are determined in advance. Thus, the user guesses search keywords that might return a document that s/he desires, and repeatedly performs searches while arranging ways of entering them to find useful information. On the other hand, with searches on intranets, file servers, or within client PCs, the existence of the target document is often known in advance, and the user executes searches by giving keywords for finding it. For example, if one wishes to refer to a proposal document that was sent to Corporation A a year ago, a search is performed giving "Corporation A," content of proposal, sender of the document, etc., as keywords.

Today, document searches in corporate servers are often performed in corporations' handling of audits. In such cases, personnel outside of the department that is subject to audit, such as auditors, in-house audit departments, etc., or internal personnel, who have been instructed or indicated by such external personnel, execute searches for a relevant document. In other words, the person actually executing the search is often not the creator of the relevant document, and would therefore not immediately know what kind of documents are located where on file servers. Further, if there are a plurality of relevant documents, given the nature of audits, it would be required that they be found without any omission.

Incidentally, in common search systems, it is possible to enter one search keyword or a plurality of search keywords, and to include logical operations such as documents containing all such keywords (a logical product or AND search), containing any of them (a logical sum or OR search), containing none of them (a negative or NOT search), etc. As a result, it is possible to bring it closer to the target document group that the user is hoping for. In addition, many search systems support advanced searches based on combinations of logical operations, e.g., containing keywords C and either A or B. Further, with respect to displaying a list of search results returned, there are also search systems which display, in addition to file names (or web page titles) and in two to three lines, text that includes what precedes and follows the search keyword.

However, several problems arise when actually retrieving related documents using such search techniques. For example, assuming that an auditor is trying to retrieve budget documents, a case is considered where a search is performed specifying the keyword "budget" on a search system. Here, if the keyword "budget" is not used in the document(s) that the auditor wishes to refer to, and such words as "budg./act. figures," or "business plan" are used therein instead, it/they will not be returned by the search. In other words, should one fail, at the time of the search, to come up with such synonyms for "budget" or words that encompass the concept of "budget," some information will be missed. On the other hand, assuming that one did think of the keywords "budg./act. figures" and "business plan" and broadened the scope of search targets so as to contain any of "budget," "budg./act. figures" and "business plan," if thousands or tens of thousands of search results are presented as a result, there may be included many documents that are of no interest to the user, and it would be unrealistic for him/her to go through all of them. There is also a possibility that a document that the auditor wishes to refer to does not use any of the keywords "budget," "budg./act. figures" and "business plan." In other words, even with respect to the retrieval of related documents with no (or little) omission, if too many documents are returned in a search, it would be realistic to keep it down to a reasonable number by narrowing the search to some extent. Conversely, if no or too few documents are returned in a search, it would be necessary to broaden search possibilities by suggesting keywords that may be associated with the search keywords that the user entered.

Various techniques and methods have hitherto been studied with regard to such methods of selecting search keywords that would result in a reasonable search hit count largely including contents of interest. In Patent Document 1, for example, in order to have more contents of interest be included, conventional problems of not being able to search when keywords, while having the same meaning, are distinct, as in "climate" and "weather," are overcome by assigning attributes to search keywords. In addition, in Patent Document 2, there is provided a means that refers to a thesaurus relating to a search keyword entered by the operator, takes into consideration the object of and a broader concept or narrower concept of the keyword, and automatically generates a query that the operator had implicitly intended. With respect to the generation of a query that would result in a reasonable hit count, Patent Document 3 and Patent Document 4 propose schemes that repeat the addition, deletion, expansion through synonyms, etc., of search keywords, thereby successively displaying the hit count obtained by the respective queries. These schemes display not only the query, but also how many hits there were in the search results for each of the search keywords contained in the query. In addition, Patent Document 5 proposes a scheme in which, when a document for which related documents are to be searched for is selected, a query that would result in a hit count closest to a pre-defined reference hit number is automatically generated while being dynamically altered.

Patent Document 1: JP Patent Publication (Kokai) No. 6-187374 A (1994)
Patent Document 2: JP Patent Publication (Kokai) No. 5-250411 A (1993)
Patent Document 3: JP Patent Publication (Kokai) No. 5-314182 A (1993)
Patent Document 4: JP Patent Publication (Kokai) No. 11-15841 A (1999)
Patent Document 5: JP Patent Publication (Kokai) No. 2005-100136 A
Patent Document 6: JP Patent Publication (Kokai) No. 2006-12078 A

SUMMARY OF THE INVENTION

Problems to be Solved by the Invention

However, with the techniques of Patent Document 1 through Patent Document 4, since an appropriate query is generated while referring to the search hit count and based on search keywords and logical operations entered by the user, while they are effective in cases where the user has a clear search purpose and has a solid image in advance with respect to the search results to be obtained through the query, they cannot address cases in which targets to be searched for are not clearly defined or cases in which s/he is unable to come up with appropriate keywords representing that which s/he wishes to search for. For example, if, in an audit, an activity report on human resource development were demanded, it would be hard to guess what kind of search keywords one should search with. In this case, it would be hard to find what is sought using the search keyword "human resource development," and "education" or "on-the-job training" would probably be preferable instead. With respect to such vague targets, since specific keywords are unknown, it is difficult to retrieve related documents with conventional techniques.

In addition, with Patent Documents 3 and 4, although, in the process of creating a query, suggestions for search keywords, such as replacement with synonyms, etc., are made to make it easier for the user to narrow down the targets, it is not possible to know in detail the relation among such candidate keywords. For example, in Patent Document 3, it is shown that of the 20,568 documents containing the keyword "information (that is written as "joho" in Patent document 3)," there are 9,321 that contain "search" and 7,566 that contain "medium." However, in using this scheme, how many overlaps, for example, there are between the set of documents containing "search" and the set of documents containing "medium" cannot be known until a search is executed. In order to know this, one would have to find out the hit count by performing an AND search for "information," "search" and "medium."

FIG. 1 shows an example of a case where the relation among these keywords is examined using Patent Document 3. If there are 7,566 hits for "medium" in an AND search for "information AND search" and "medium," one would be able to tell that "information" and "search" are always used when "medium" is used. In other words, one would be able to tell that "medium" and "information or search" are concepts with similar impressions. Conversely, if there are 0 hits, one would be able to tell that "medium" and "search" are keywords for conflicting concepts. Because such correlation was unknown, it was conventionally necessary to repeatedly add or delete search keywords in narrowing down search targets. With conventional techniques, there was no way of knowing such quantitative findings (how many hits there are) and qualitative findings (document groups of what kind of keywords are present, and what kind of tendencies there are) in advance.

In addition, with Patent Document 5, although a query can be constructed automatically in such a manner as to come close to a pre-defined hit count, the user has no way of knowing, to begin with, what might be considered a reasonable number to narrow down to from the total hit count. For example, 100 may be specified as the number of related documents to refer to, but just 10 of those may be sufficient for the user in some cases, while in others related documents may not be considered entirely covered unless there are 300.

The present invention is made in view of the problems above, and provides a document search system that is capable of efficiently and intuitively retrieving desired documents when retrieving related documents using a search system.

Means for Solving the Problems

A document search system of the present invention presents, along with a display of a list of search results, a new query candidate and the hit count returned with that query.

In other words, a document search system of the present invention finds, based on a search keyword, a document containing the search keyword from among a document DB in which documents to be searched are accumulated, the document search system comprising: a related word dictionary in which are collected related words of search keywords; a related word query generation processing part configured to extract from the related word dictionary a related word of a search keyword contained in a first query that has been entered, and to generate using the related word a second query which is a new query; a search execution part configured to calculate an increase/decrease between a hit count for search results returned with the first query and a hit count for search results returned with the second query; and a search result display processing part configured to simultaneously display on a display part the first query, the search results returned with the first query, the hit count for the search results, the second query, the hit count for the search results returned with the second query, and the increase/decrease.

In the case above, it may further comprise a Venn diagram drawing processing part configured to display on the display part and in a Venn diagram a correlation between the search results returned with the first query and the search results returned with the second query.

In addition, a document search system according to the present invention finds, based on a search keyword, a document containing the search keyword from among a document DB in which documents that are to be search targets are accumulated, the document search system comprising: an associated keyword query generation processing part configured to generate a second query, which is a new query, using a frequently occurring keyword occurring frequently in search results for a first query that has been entered; a search execution part configured to calculate an increase/decrease between a hit count for the search results returned with the first query and a hit count for search results returned with the second query; and a search result display processing part configured to simultaneously display on a display part: the first query; the search results returned with the first query; the hit count for the search results; the second query; the hit count for the search results returned with the second query; and the increase/decrease.

In the case above, it may further comprise a Venn diagram drawing processing part configured to display on the display part and in a Venn diagram a correlation between the search results returned with the first query and the search results returned with the second query.

In addition, a document search system of the present invention finds, based on a search keyword, a document containing the search keyword from among a document DB in which documents that are to be search targets are accumulated, the document search system comprising: a partial query generation processing part configured to generate a second query, which is a new query, by omitting a portion of a plurality of search keywords contained in a first query that has been entered; a search execution part configured to calculate an increase/decrease between a hit count for search results returned with the first query and a hit count for search results returned with the second query; and a search result display processing part configured to simultaneously display on a display part: the first query; the search results returned with the first query; the hit count for the search results; the second query; the hit count for the search results returned with the second query; and the increase/decrease.

In the case above, it may further comprise a Venn diagram drawing processing part configured to display on the display part and in a Venn diagram a correlation between the search results returned with the first query and the search results returned with the second query.

Further, in the document search systems above, if the search execution part determines there is contained in the search results returned with the second query a new search result that is different from the search results returned with the first query, the search result display processing part, in displaying the search results returned with the second query, displays on the display part with the new search result emphasized.

Effects of the Invention

According to a search system of the present invention, in retrieving related documents, by presenting, along with a display of a list of search results, a candidate for the next query and a hit count returned with that query, the user is able to efficiently and intuitively retrieve a desired document.

BRIEF DESCRIPTION OF THE DRAWINGS

FIG. 7 is an example of a screen presenting a display of a list of search results and query candidates using frequently occurring keywords in the search results.

MODE FOR CARRYING OUT THE INVENTION

A document search system according to an embodiment of the present invention is described below with reference to the drawings. It is noted that the present embodiment is merely an example for realizing the present invention, and does not in any way limit the technical scope of the present invention.

<Document Search System Configuration>

Figure 1:
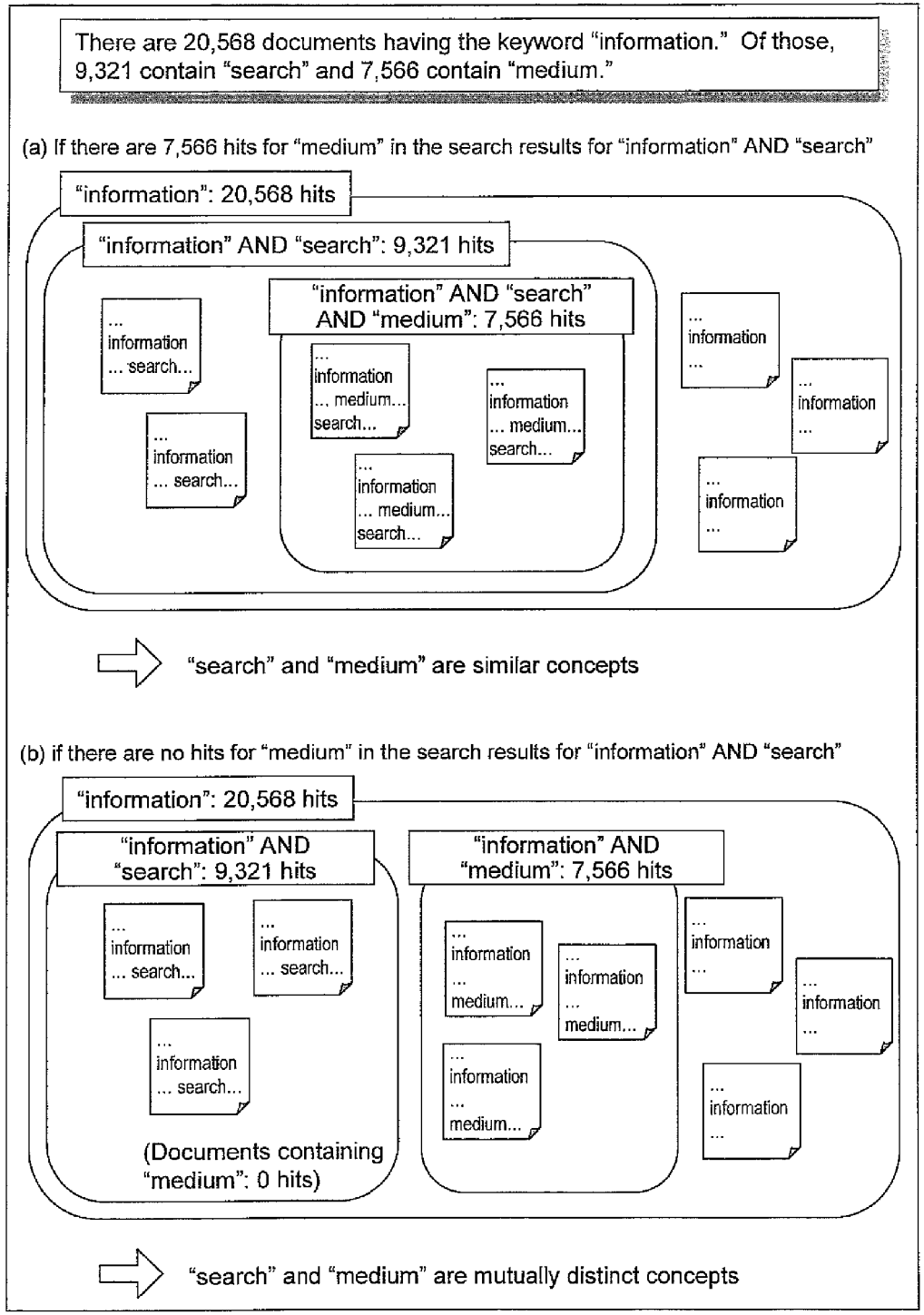
FIG. 1 is a diagram showing the relation among search keywords.
Figures 2, 3:
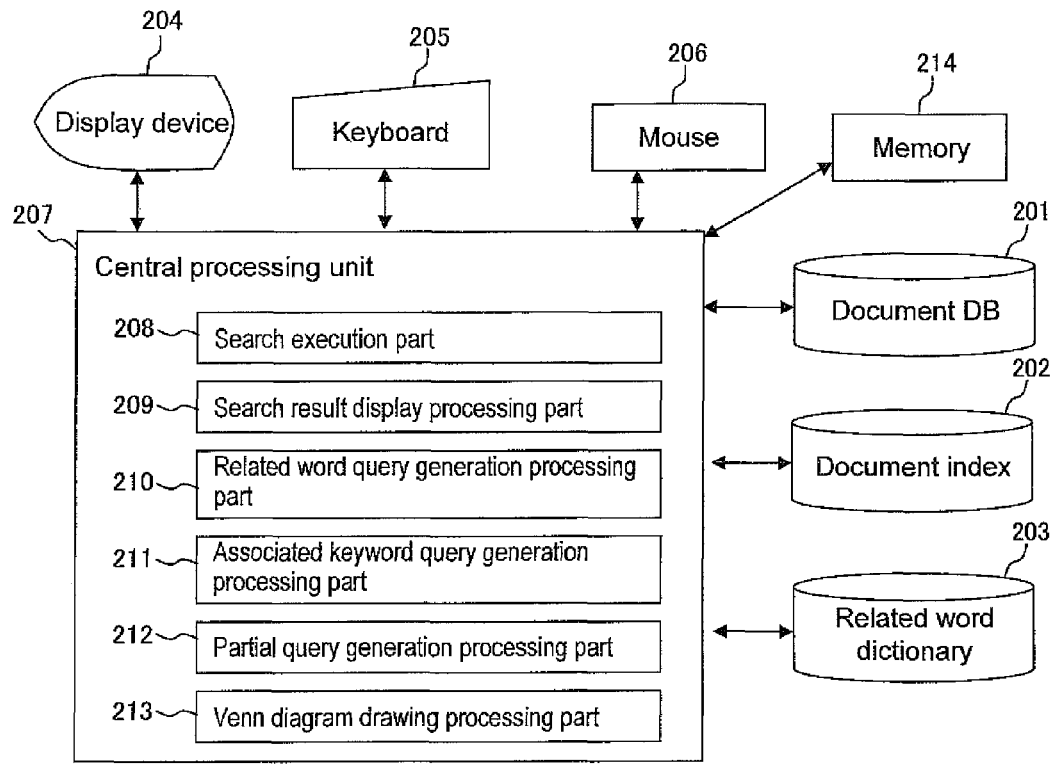
FIG. 2 is a schematic diagram of a search system according to an embodiment of the present invention.
FIG. 3 is one example of the data structure of a related word dictionary.

FIG. 2 is a configurational diagram schematically showing the internal structure of a document search system that is built as an embodiment of the present invention. This system comprises: a document DB 201 in which documents to be searched are accumulated; a document index 202 in which index information of documents is accumulated; a related word dictionary 203 in which relations among related words are collected; a display device 204 for displaying search results, query candidates, etc.; a keyboard 205 and a pointing device 206, such as a mouse, etc., for entering search keywords and performing such operations as selecting from menus, etc.; a central processing unit 207 configured to perform necessary arithmetic processing, control processing, etc.; and a memory 214 for temporarily storing search results. Here, the document DB 201 is also to cover those whose instances lie on a network, as in a corpus of web documents on the Internet. Further, the document DB 201 also covers cases where its instance as a DB is not physically singular but plural instead. The document index 202 is for finding the desired document quickly from the query that has been entered, and its specific form includes association between morphemes and actual documents within the document DB 201 (in the case of search algorithms based on morphological analysis), and association between character strings of N characters and actual documents within the document DB 201 (in the case of search algorithms based on an N-gram). At the time of search execution, those that match the query are found using the document index 202, and association with actual documents are performed on the display screen for search results. The document DB 201, the document index 202 and the related word dictionary 203 may exist within a local PC, as well as on a network.

<Central Processing Unit Configuration>

The central processing unit 207 comprises: a search execution part 208 configured to execute a search using the document index 202 in accordance with a query that has been entered; a search result display processing part 209 configured to display a list of search results and a query candidate for adjusting search targets; a related word query generation processing part 210 configured to generate a query using a related word of a keyword contained in the query; an associated keyword query generation processing part 211 configured to generate a query using a word frequently contained in a group of documents in the search results; a partial query generation processing part 212 configured to newly generate a query by omitting one or a plurality of keywords if the query comprises a plurality of keywords; and a Venn diagram drawing processing part 213 configured to display in a Venn diagram the relation among the search results. Further, the processing parts and execution parts above, as well as the programs, data, etc., used in the processing parts and execution parts above, may be provided by being stored on such recording media as CD-ROMs, DVD-ROMs, MOs, Floppy Disks (Registered Trademark), USB memories, etc.

<Related Word Dictionary Configuration>

FIG. 3 is an example of data contained in the related word dictionary 203. The data comprises pairs of keywords 301 and related words 302 in which terms related to the keywords are gathered. It is assumed the related words are defined in accordance with targets of the search system. Typically, these would include synonyms like "document" for the keyword "paper" shown at 303, and full names or abbreviations like "ABC Business Department, 1st Design Division" or "Div. 1" for the keyword "1st Design Division" shown at 304. Others include different notations for years like "Heisei 19" or "H19" for the keyword "year 2007" shown at 305, variations in notation like "centre" for the keyword "center," typos or misspellings shown at 306, and so forth. Further, there are also included words that are not synonymous but are strongly related like "education," "on-the-job training" and "off-the-job training" for the keyword "human resource development" shown at 307, and words that have a mutually inclusive relation (words of a broader/narrower concept) like "Kanto region" for the keyword "Tokyo" shown at 308, and "beef," "pork," "chicken," etc., for the keyword "meat" shown at 309. An embodiment in which a thesaurus on the Internet is used as this related word dictionary is also possible.

<Document Search Process>

Figure 4:
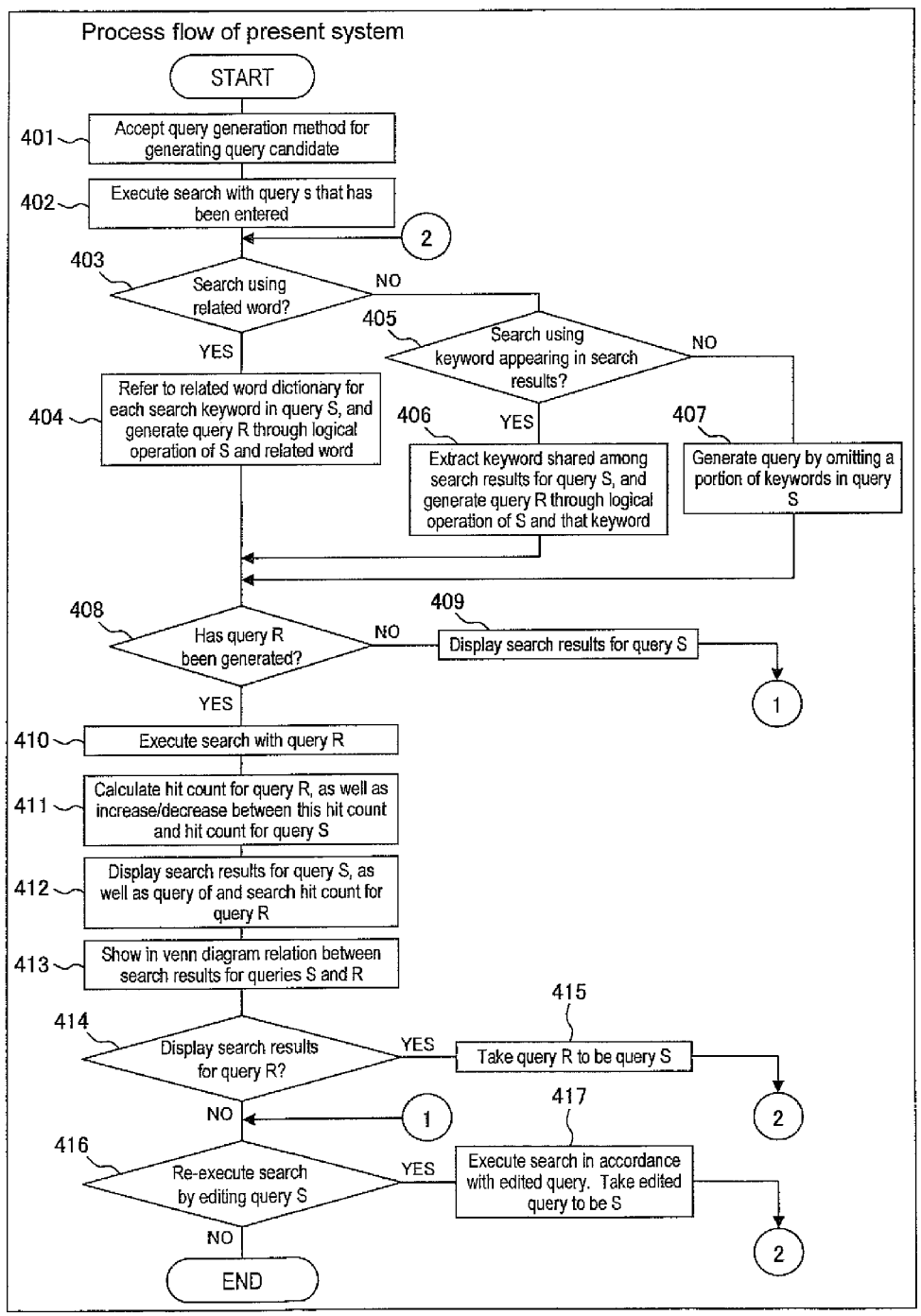
FIG. 4 is a flowchart showing a process flow of the present invention.

Next, a process performed in a document search system of the present embodiment configured in the manner above is described with reference to FIG. 4. FIG. 4 is a flowchart schematically showing a process flow by a document search system.

In step 401, the search execution part 208 accepts a query generation method selected by the user. A query generation method refers to a method by which the present search system generates "a query candidate for further narrowing (or altering) search targets from search results" and, depending on what kind of information it is generated based on, there are the following three methods. The first is a method of generating a query using information on related words; the second is a method of generating a query using a keyword that occurs frequently among a group of documents in the search results; and the third is a method of newly generating a query by omitting a portion of the keywords in the query. As for a screen display that serves as an interface in the selection of a query generation method by the user, a description will be provided later with reference to FIG. 5.

In step 402, the search execution part 208 executes a search using the document index 202 in accordance with a query S entered into the present system by the user. At this point, if necessary, pre-processing may be performed before executing the search such as word separation, where spaces are inserted between the words contained in the query S using morphological analysis, deletion of particles, etc. Further, if the query S is written in English, such pre-processing as deleting prepositions and conjunctions, and so forth, is performed. In steps 403-407 below, it is explained how, with respect to each case of the three query generation methods discussed above, a candidate for a new query R for narrowing down (or altering) the search targets is generated.

In steps 403 and 404, if the search execution part 208 accepted in step 401 a method of generating a query using a related word, the related word query generation processing part 210 examines, by referring to the related word dictionary 203, if there is a related word for each search keyword contained in the query S that was entered in step 402. If there is a related word, the query R is newly generated by concatenating a keyword and a related word thereof with a logical operator (AND or OR). For example, if the query S is "X AND Y," and there is Z as a related word for keyword X, then the queries R would be "(X AND Z) AND Y," "(X OR Z) AND Y" and "Z AND Y." Alternatively, if the keyword contained in the query S is "X" alone, and there is Z as a related word for keyword X, then the queries R would be "Z," "X AND Z" and "X OR Z." The queries R for all cases are listed by thus combining logical operations. If there is no related word, or if there is a related word but that related word is contained in the query (e.g., if the query S is "X AND Y" and Y is a related word for keyword X), nothing is done since a query R based on related words cannot be generated.

In steps 405 and 406, if the search execution part 208 accepted in step 401 a method for generating a query using a frequently occurring keyword appearing among a group of documents in the search results, the associated keyword query generation processing part 211 extracts a keyword that occurs frequently among a group of documents in the results for the search executed in step 402. If, among the frequently occurring keywords extracted at this point, there is one that is contained in the query S, it is omitted. A search that uses a characteristic keyword extracted from among a group of documents in the search results is referred to as an "associative search" and is employed in the present embodiment as well. For example, just as an associative searching technique is employed in Patent Document 6, in the present invention, a characteristic keyword used among documents in the search results is extracted using the document index 202, and a search is performed therewith. The associated keyword query generation processing part 211 newly generates a query R by concatenating the keyword extracted through an associative search with the query S using logical operators. If there are many frequently occurring keywords, such use in which a certain number of top keywords selected in accordance with their frequency of occurrence are concatenated with the query S is also conceivable.

In step 407, if the search execution part 208 accepted in step 401 a method for generating a query through omission of a keyword(s), the partial query generation processing part 212 generates a query R in a form where some of the plurality of keywords contained in the query S are omitted. Here, as keywords to be omitted, all combinations among all keywords appearing in the query S are covered. R is configured in such a manner that, as a result of omitting the omission keywords, the search conditions of the query R would result in a broader search scope than with the search conditions of the query S (an increase in the search hit count). More specifically, if the keywords are linked with an AND and an OR, the AND and a keyword are omitted, and if the keywords are linked only with an AND (or only with an OR), the AND (or the OR) and a keyword are omitted. For example, if the query S is "X AND Y OR Z," the queries R would be "Y OR Z" (where X has been omitted), "X OR Z" (where Y has been omitted), "X AND Y" (where Z has been omitted), "X" (where Y and Z have been omitted), "Y" (where X and Z have been omitted), and "Z" (where X and Y have been omitted). If the query S contains only one keyword, nothing is done since the query R cannot be generated.

If the search execution part 208 determines, in step 404, 406 or 407 mentioned above, that the query R cannot be generated, the process proceeds from step 408 to step 409. In step 409, the search result display processing part 209 displays the results of the search executed in step 402. Thereafter, the process proceeds to step 416 which is later described.

On the other hand, if the related word query generation processing part 210, the associated keyword query generation processing part 211 or the partial query generation processing part 212 generates the query R in step 404, 406 or 407 mentioned above, the process proceeds from step 408 to step 410. In step 410, the search execution part 208 executes a search in accordance with that query R.

In step 411, the search execution part 208 calculates the hit count for the query R, as well as the increase/decrease when the hit count for the query R and the hit count for the query S are compared.

In step 412, based on the information above, the search result display processing part 209 displays the search results for the query S, the query of the query R as well as the hit count returned with that query, and the increase/decrease when the hit count for the query R and the hit count for the query S are compared. In displaying the search results for the query S in a list, they are displayed in the order of importance of the documents. With respect to algorithms for determining this display order, there are known: TF-IDF, which takes both documents and queries as vectors comprising a corpus of terms and makes a determination based on the similarity among the vectors; PageRank, which measures popularity using the link structures of web pages; Subject-Specific Popularity and HITS, which are improvements of Page Rank above; Block-level Link Analysis, which calculates importance based on links among meaningful blocks within pages instead of the link structures among pages; Vision-based Page Segmentation Algorithm, which takes into consideration the locations of important contents within pages; etc.

In step 413, the Venn diagram drawing processing part 213 shows by means of a Venn diagram the relation among the search results returned with the query R. In the Venn diagram, region areas reflecting hit counts are shown, and the number of search results is displayed in each region. Methods of displaying a Venn diagram may be categorized into the following three depending on which query generation method the search execution part 208 accepted in step 401. (1) If the query generation method of generating a query using related words was accepted, drawing is performed in such a manner that differences in the search results per related word can be understood. Specifically, if the query S contains a search keyword that has a related word, there is shown in a diagram the interrelation among a set of search results for a query in which the search keyword has been omitted from the query S, a set of search results for the search keyword, and a set of search results for the related word of the search keyword. For example, if the query S is "K AND X AND Y," the search keyword having a related word is "K," and the related word is "K'," then the relation among the search results for the queries "X AND Y," "K" and "K'" is shown through a Venn diagram. Further, if the query S comprises a single keyword "K" and there is a related word "K'" for the keyword "K," {search results for when the search keyword is omitted from the query S} would be indefinable. In this case, the relation between the keywords "K" and "K'" is shown in a Venn diagram.
(2) If the query generation method of generating a query using frequently occurring keywords that appear in a group of documents in search results was accepted, drawing is performed in such a manner that how searches using the frequently occurring keywords would affect the search results (how the search targets can be narrowed down) can be understood. Specifically, there is shown the relation between a set of search results for the query S and a set of search results for when a search is performed with the frequently occurring keywords.
(3) If the query generation method of generating a query by omitting a portion of the keywords in the query was accepted, there is shown the relation between the original query S and a query R in which a portion of the keywords in the query S has been omitted.

In addition, where A1, . . . , An are finite sets, by combining the following inclusion-exclusion principle:

$$\left| \bigcup_{i=1}^{n} A_i \right| = \sum_{i=1}^{n} |A_i| - \sum_{i<j} |A_i \cap A_j| + \sum_{i<j<k} |A_i \cap A_j \cap A_k| - \ldots \pm |A_1 \cap A_2 \ldots \cap A_n|$$

[Equation 1]

with De Morgan's laws $$\left| \bigcap_{i=1}^{N} A_i \right| = \left| \overline{\bigcup_{i=1}^{N} \overline{A_i}} \right|$$

[Equation 2]

it is possible to recursively calculate the number of search results in each region.

Here, let |A| denote the number of elements (cardinality) of set A, A∪B denote "A OR B," A∩B denote "A AND B," and $$\overline{A}$$

[Equation 3]

denote "NOT A."

Figure 6:
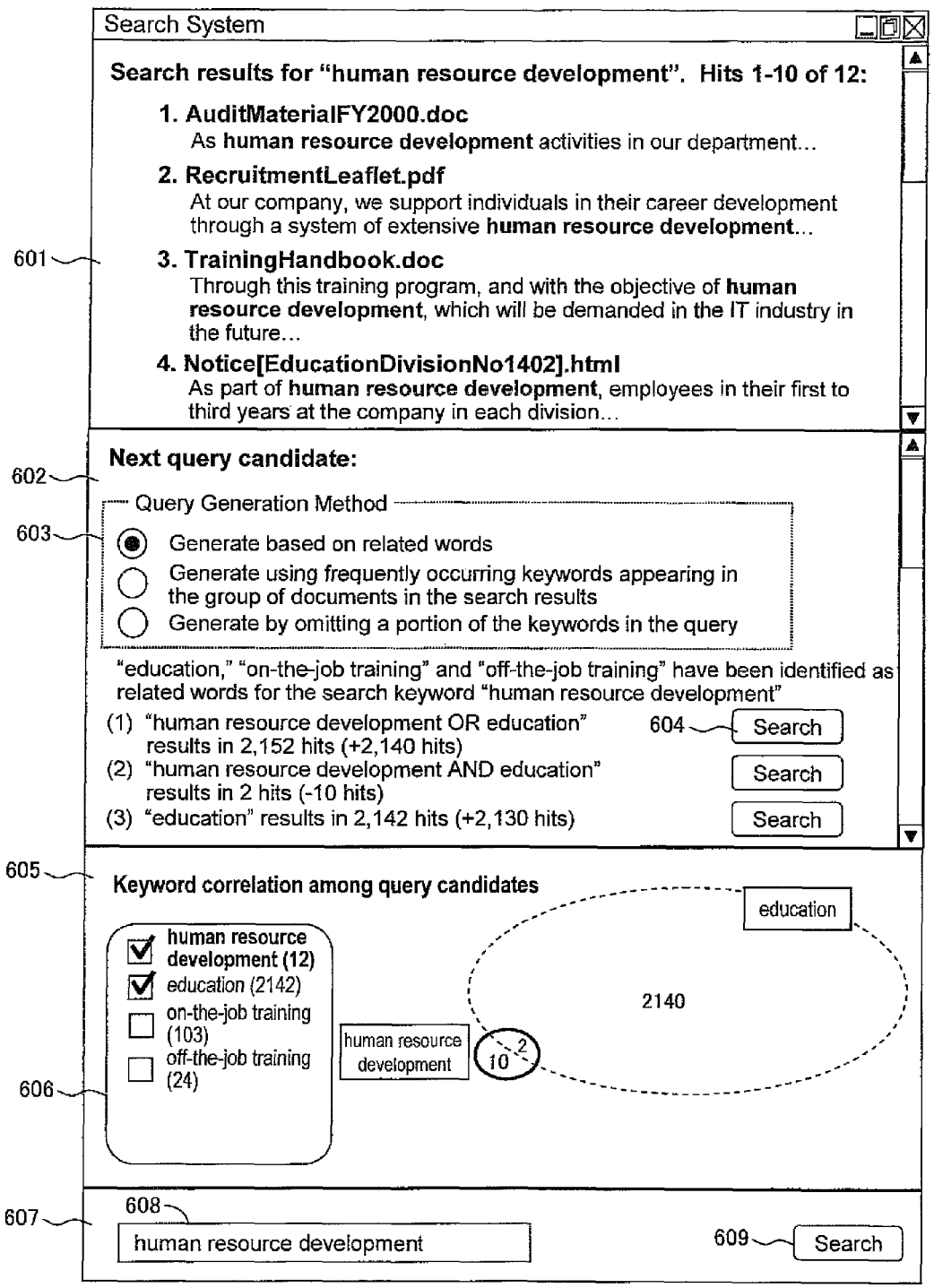
FIG. 6 is an example of a screen presenting a display of a list of search results and query candidates using related words.

In addition, generally, Venn diagrams often represent the relation among three categories. However, they are capable of representation regardless of the number of categories the relation involves (reference: Frank Ruskey, Carla D. Savage, and Stan Wagon, "The Search for Simple Symmetric Venn Diagrams," Notices of the AMS 53 (11): 1304-1311). However, since the diagram becomes complicated when the relation among a large number of categories is represented, modes of use in which, for example as shown in FIG. 6 which is later described, the relation among categories is represented in accordance with a selection of display items by the user, and so forth, are also conceivable.

In steps 414 and 415, if the user, having seen the query R displayed in step 412, requests a display of search results using that query R, the search execution part 208 replaces the query S with the query R selected by the user, and the process is continued from step 403. At this point, the search results for the new query S would be those returned in step 410. In addition, a mode of use in which, in displaying a list of the search results in step 412 executed a second time or thereafter, documents of search results that have been newly added are displayed with an emphasis to highlight differences is also conceivable.

In steps 416 and 417, if the user edits the query S for re-execution with a new query, the search execution part 208 executes a search in accordance with the edited query. With the edited query taken to be S anew, the process is continued while going back to step 403. Further, if the user does not edit the query S for re-execution of a search, the process is terminated.

<Initial Screen Display Example of Document Search System>

Figure 5:
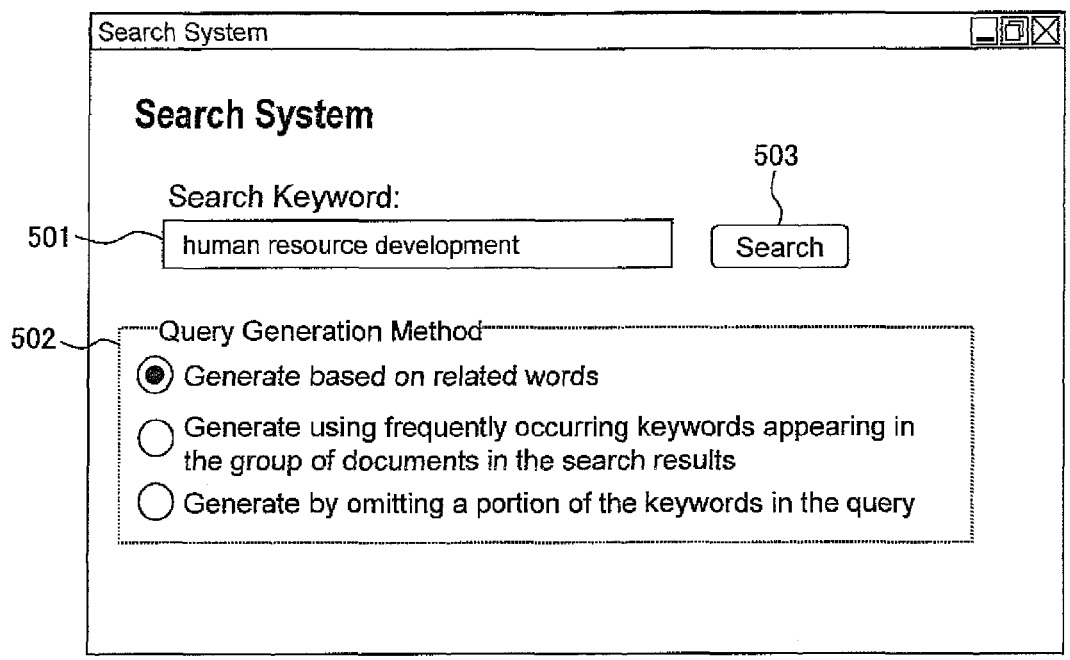
FIG. 5 is an example of the initial screen of a search system of the invention.

FIG. 5 is a diagram showing an example of an initial screen display of the present system. On the initial screen, there are a query input text box 501 for entering a query, and a query generation method selection menu 502 for narrowing down (or altering) search targets with respect to search results. With the query generation method selection menu 502, it is made possible to select from the following three using radio buttons (step 401 in FIG. 4): a method of generation based on related words; a method of generation using frequently occurring keywords appearing in a group of documents among search results; and a method of generation by omitting a portion of the keywords in a query. Once the user enters these items or settings, and presses a search execution button 503, a search is started (step 402 in FIG. 4). Hereinafter, a description will be provided taking an example where documents are retrieved from the document DB 201 for an activity report regarding human resource development.

<Screen Display Example of Search Results Using Related Words>

FIG. 6 shows an example of a screen display of a list of search results and a list of query candidates using related words, which appears as a result of pressing the search execution button 503 in FIG. 5.

The query and the hit count are displayed in a search result list pane 601, and a list of search results is displayed therebelow. Near the title of each document returned by the search is displayed text in the document containing the search keyword. The user looks at these titles and text to determine whether or not the search results are what the user was hoping for.

A list of queries for adjusting the search targets is displayed in a query candidate display pane 602. In accordance with which criterion the queries were generated is displayed in a query generation method menu 603 in the upper portion of this pane 602. With respect to the generation of queries in accordance with the criterion of related words in FIG. 6, a list of terms related to the entered query is displayed below the menu 603. In other words, if a search keyword contained in the entered query is registered as the keyword 301 in the related word dictionary 203, the corresponding related words 302 are displayed. Further, there are displayed a list of new queries using such related words, the hit count for the search results returned with the new queries, and an increase/decrease calculated by comparing the hit count for the search results for each of the new queries with the hit count for the search results for the original query. Once the user presses a search execution button 604 located near each of the queries, a search is executed based on the corresponding query.

The correlation between the hit count for the search results for the query entered by the user and the hit counts for the search results for the related words presented in the query candidate display pane 602 is displayed in a Venn diagram in a Venn diagram display pane 605. The sets of documents in the Venn diagram are search results for keywords selected by the user in a related word selection menu 606. In this menu 606 are displayed a list of related words obtained from the query entered by the user, their respective hit counts, and check boxes. Venn diagram display is performed for the search results corresponding to the keywords for which the user checked the check boxes. As shown in the Venn diagram display pane 605, the hit count is displayed in each region. For example, since there are 2 hits for "human resource development AND education," 2,142 hits for "education," and 12 hits for "human resource development," it is displayed that there are 2 hits in the overlapping region between "education" and "human resource development" Further, the hit counts are displayed only for portions related to each region enclosed with a broken line or a solid line. For example, of all 12 hits for "human resource development," it is displayed that there are 2 hits in the region that overlaps with "education" and 10 hits in the remaining region.

In a query input pane 607, there are a query input text box 608, and a search execution button 609 for executing the query in the text box 608. A mode of use in which, once the user selects a given region in the Venn diagram display in the Venn diagram display pane 605, a query that would extract the portion of that selected region is automatically entered in the query input text box 608 is also conceivable. In addition, if the user determines that the search keywords with respect to the search targets are inappropriate, and wishes to rewrite the query or enter a new query, a different query is newly entered in the query input text box 608 and executed.

By way of such an invention, since a query using related words (a second query) is automatically presented even without the user being conscious of related words relating to the search keywords (or even if s/he is unable to think of any related words), the user is able to retrieve a group of documents s/he was hoping for with little being left out.

Further, since the hit count for a search performed with the second query, as well as an increase/decrease in the hit count when the second query is compared with the original query (first query) are simultaneously displayed, the user is able to make decisions for retrieving documents in an appropriate number. For example, assuming the number of search results that the user is realistically capable of viewing is tens of hits to a hundred hits, the user would be able to make such decisions as "Since adding this search keyword results in a thousand or more hits, I need to think of a different keyword," "Since adding this search keyword only increases the hit count by three, I can afford to add it," and so forth.

Further, when related words of search keywords contained in the first query are added to that query, tendencies and characteristics of search results can be confirmed prior to the execution of a search. In other words, it can be determined with ease what kind of related words a search should next be executed with. For example, in the case of FIG. 6, it can be seen that a keyword search for "human resource development" returns few results, that, regarding human resource development activities, there may be many related documents in the search results for "education," that a large amount of documents are included in the search results for "education," and so forth.

Further, through a Venn diagram display, it is possible to grasp relations among search keywords and among search keywords and related words, and to visually understand appropriate keyword combinations as well as the hit counts returned by queries thus combined.

<Screen Display Example of Search Results Using Frequently Occurring Keywords>

FIG. 7 shows a screen display example of a list of search results and a list of query candidates based on frequently occurring keywords in the search results. It shows a screen where, in the query generation method menu 603 in FIG. 6, "generate using frequently occurring keywords appearing in the group of documents in the search results" has been selected, and a search has been executed with "human resource development OR education" for the query.

As in FIG. 6, in a search result list pane 701, the query and the hit count are displayed, and a list of search results for the new query "human resource development OR education" is displayed therebelow. Documents that have been newly added to the previous search results are displayed with an emphasis (the parts indicated with stars in FIG. 7). By way of such an invention, the user is able to directly understand what kind of documents have been added, and is able to readily see the effects of the second query.

A list of query candidates for adjusting the search targets is displayed in a query candidate display pane 702. Here, it has been selected in a query generation method menu 703 that generation is to be performed using frequently occurring keywords appearing in the group of documents in the search results. Further, frequently occurring keywords appearing in the actual search results are presented below the query generation method menu 703.

As in FIG. 6, the correlation between the hit count for the search results for the query entered by the user and frequently occurring keywords appearing in the search results is represented by a Venn diagram in a Venn diagram display pane 704.

By way of such an invention, since a query using frequently occurring keywords in search results (second query) is automatically presented, the user is able to efficiently retrieve a group of desired documents.

In addition, with respect to queries using frequently occurring keywords, since the search hit count and an increase/decrease in the hit count are simultaneously displayed, the user is able to retrieve documents in an appropriate number.

In addition, the user is able to understand with ease what kind of keywords occur frequently among the search results for the query that was entered. For example, in the case of FIG. 7, one is able to get an overview that notices of "course guide," a notice of "course completion report," and documents relating to "new recruit" education are contained in large numbers in the search results for the query "human resource development OR education."

Further, by way of a Venn diagram display, it is possible to grasp the relation between the search results for the original query (first query) and frequently occurring keywords, and it is possible to visually understand appropriate keyword combinations as well as the hit count for a query thus formulated.

For example, in the case of FIG. 7, it can be seen that documents containing the keyword "course completion report" always include the keyword "human resource development" or "education," that no document simultaneously contains "course guide" and "course completion notice," and so forth. Thus, if the user is retrieving activity reports regarding human resource development, s/he is able to make a decision to exclude course guide documents from targets for retrieval as they appear unrelated. On the other hand, s/he is able to make a decision to include keywords like "course completion report," "new recruit," etc., in targets for retrieval as they appear to be related to human resource development activities.

<Screen Display Example of Search Results Based on an Omission of a Portion of Keywords>

Figure 8:
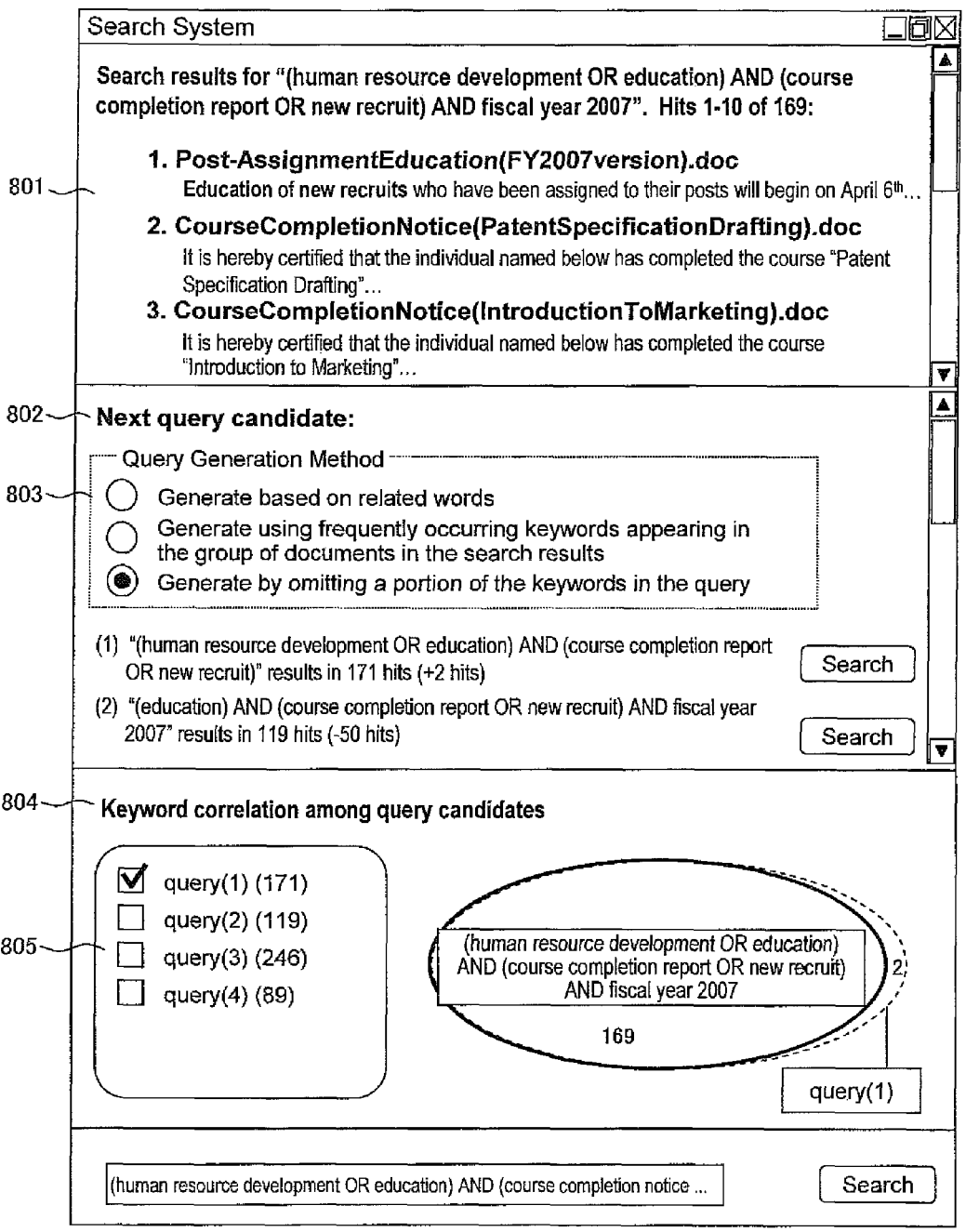
FIG. 8 is an example of a screen presenting a display of a list of search results and query candidates created by omitting search keywords.

FIG. 8 shows a screen display example of a list of search results and a list of query candidates based on an omission of a portion of the keywords in the query. It shows a screen where, in the query generation method menu 703 in FIG. 7, "generate by omitting a portion of the keywords in the query" has been selected, and a search has been executed with "(human resource development OR education) AND (course completion notice OR new recruit) AND fiscal year 2007" for the query.

As in FIG. 6, in a search result list pane 801, the query and the hit count are displayed, and a list of search results for the query "(human resource development OR education) AND (course completion notice OR new recruit) AND fiscal year 2007" is displayed. In a query candidate display pane 802, a list of query candidates for adjusting the search targets is displayed. Here, it has been selected in a query generation method menu 803 that generation is to be performed by omitting a portion of the keywords in the query. For example, query (1) in FIG. 7 is "(human resource development OR education) AND (course completion notice OR new recruit)," where this is a query that has been generated by omitting the keyword "fiscal year 2007" from the original query.

As in FIG. 6, the correlation between the hit count for the search results for the query entered by the user and the search results for the query generated by omitting a portion of the search keywords is represented by a Venn diagram in a Venn diagram display pane 804. The sets of documents in the Venn diagram are search results for the query selected by the user in a query candidate selection menu 805. A list of query candidates presented in the query candidate display pane 802, their respective hit counts, and check boxes are displayed in the query candidate selection menu 805. A Venn diagram display is performed for the search results corresponding to the keywords for which the user checked the checkboxes.

By way of such an invention, the user is able to see if the conditions in the original query (first query) are too strict/too broad in relation to the targets s/he wishes to retrieve. For example, where the first query entered by the user is an AND search with a certain search keyword and a general search keyword, if, as a result of a search using that first query, hardly any change is observed in the hit count when that general keyword is omitted, it can be determined that that keyword should be omitted. Conversely, where the first query is an AND search with a certain search keyword and a special search keyword, if, as a result of a search using that first query, only two to three hits are returned, it can be determined that that special search keyword should be omitted. For example, in the case of FIG. 8, even when a search is performed using a query in which "fiscal year 2007" is omitted from query (1), i.e., the original query, the difference is only two hits. In other words, there is a possibility that it was merely by chance that these two documents did not include the keyword "fiscal year 2007." In addition, since an increase of two hits is only a slight increase relative to the 169 hits in the original search results, it may also be determined that keeping these two hits included as records of human resource development activities would allow for fewer omissions and a more thorough coverage.

Further, through the Venn diagram display, it is possible to visually confirm the search results for the original query (first query) and the effects of omitting search keywords from the original query before executing a search.

CONCLUSION

As described above, according to the present embodiment, since queries for adjusting the search targets are presented while a list of search results is displayed, the user is able to efficiently and directly understand what kind of search keywords would be appropriate as subsequent search keywords. In addition, should the search results not be what the user was expecting (when wrong search keywords were specified), s/he would be able to see it readily. Further, since it is possible to find other keywords that are more appropriate over the course of repeated searches, a search that better suits the user's purpose can be executed.

Description of Symbols

| | |
|---|---|
| 201 | Document DB |
| 202 | Document index |
| 203 | Related word dictionary |
| 204 | Display device |
| 205 | Keyboard |
| 206 | Mouse |
| 207 | Central processing unit |
| 208 | Search execution part |
| 209 | Search result display processing part |
| 210 | Related word query generation processing part |
| 211 | Associated keyword query generation processing part |
| 212 | Partial query generation processing part |
| 213 | Venn diagram drawing processing part |
| 214 | Memory |
| 501 | Query input text box |
| 502 | Query generation method selection menu |
| 503 | Search execution button |
| 601 | Search result list pane |
| 602 | Query candidate display pane |
| 603 | Query generation method menu |
| 604 | Search execution button |
| 605 | Venn diagram display pane |
| 606 | Related word selection menu |
| 607 | Query input pane |
| 608 | Query input text box |
| 609 | Search execution button |
| 701 | Search result list pane |
| 702 | Query candidate display pane |
| 703 | Query generation method menu |
| 704 | Venn diagram display pane |
| 801 | Search result list pane |
| 802 | Query candidate display pane |
| 803 | Query generation method menu |
| 804 | Venn diagram display pane |
| 805 | Query candidate selection menu |

The invention claimed is:

1. A document search system for finding, based on a search keyword, a document containing the search keyword from among a document DB in which documents that are to be search targets are accumulated, the document search system comprising:
  a related word dictionary in which related words of search keywords are gathered;
  a related word query generation processing part configured to extract from the related word dictionary a related word of a search keyword contained in a first query that has been entered, and to generate a second query, which is a new query, using the related word; a search execution part configured to calculate an increase/decrease between a hit count for search results returned with the first query and a hit count for search results returned with the second query; and a search result display processing part configured to simultaneously display on a display part: the first query; the search results returned with the first query; the hit count for the search results; the second query; the hit count for the search results returned with the second query; and the increase/decrease, wherein if the search execution part determines there is contained in the search results returned with the second query a new search result that is different from the search results returned with the first query, the search result display processing part, in displaying the search results returned with the second query, displays on the display part with the new search result emphasized.

2. A document search system for finding, based on a search keyword, a document containing the search keyword from among a document DB in which documents that are to be search targets are accumulated, the document search system comprising:

an associated keyword query generation processing part configured to generate a second query, which is a new query, using a frequently occurring keyword occurring frequently in search results for a first query that has been entered;

a search execution part configured to calculate an increase/decrease between a hit count for the search results returned with the first query and a hit count for search results returned with the second query; and a search result display processing part configured to simultaneously display on a display part: the first query; the search results returned with the first query; the hit count for the search results; the second query; the hit count for the search results returned with the second query; and the increase/decrease, wherein if the search execution part determines there is contained in the search results returned with the second query a new search result that is different from the search results returned with the first query, the search result display processing part, in displaying the search results returned with the second query, displays on the display part with the new search result emphasized.

3. A document search system for finding, based on a search keyword, a document containing the search keyword from among a document DB in which documents that are to be search targets are accumulated, the document search system comprising:

a partial query generation processing part configured to generate a second query, which is a new query, by omitting a portion of a plurality of search keywords contained in a first query that has been entered;

a search execution part configured to calculate an increase/decrease between a hit count for search results returned with the first query and a hit count for search results returned with the second query; and a search result display processing part configured to simultaneously display on a display part: the first query; the search results returned with the first query; the hit count for the search results; the second query; the hit count for the search results returned with the second query; and the increase/decrease, wherein if the search execution part determines there is contained in the search results returned with the second query a new search result that is different from the search results returned with the first query, the search result display processing part, in displaying the search results returned with the second query, displays on the display part with the new search result emphasized.

4. A document search system according to claim 1, further comprising a Venn diagram drawing processing part configured to display on the display part and in a Venn diagram a correlation between the search results returned with the first query and the search results returned with the second query.

5. A document search system according to claim 2, further comprising a Venn diagram drawing processing part configured to display on the display part and in a Venn diagram a correlation between the search results returned with the first query and the search results returned with the second query.

6. A document search system according to claim 3, further comprising a Venn diagram drawing processing part configured to display on the display part and in a Venn diagram a correlation between the search results returned with the first query and the search results returned with the second query.

* * * * *